(12) United States Patent
Sohi et al.

(10) Patent No.: US 12,216,576 B2
(45) Date of Patent: Feb. 4, 2025

(54) METHOD AND APPARATUS TO REDUCE CACHE STAMPEDING

(71) Applicant: Walmart Apollo, LLC, Bentonville, AR (US)

(72) Inventors: Raikirat Sohi, Sunnyvale, CA (US); Mayur Saxena, San Jose, CA (US); Sandeep Singh, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 2 days.

(21) Appl. No.: 17/880,481

(22) Filed: Aug. 3, 2022

(65) Prior Publication Data
US 2023/0046354 A1 Feb. 16, 2023

Related U.S. Application Data

(60) Provisional application No. 63/229,224, filed on Aug. 4, 2021.

(51) Int. Cl.
*G06F 12/0802* (2016.01)
*G06F 12/121* (2016.01)

(52) U.S. Cl.
CPC ........ *G06F 12/0802* (2013.01); *G06F 12/121* (2013.01); *G06F 2212/60* (2013.01)

(58) Field of Classification Search
CPC ............. G06F 12/0802; G06F 2212/60; G06F 11/004; G06F 12/121; G06F 16/24552; G06F 2212/1008; G06F 2212/1021; G06F 2212/1024; G06F 2212/1048; G06F 2212/154; G06F 2212/173; G06F 2212/283; G06F 2212/285; H04L 67/5682
See application file for complete search history.

(56) References Cited

U.S. PATENT DOCUMENTS

| | | | | |
|---|---|---|---|---|
| 5,784,697 A | * | 7/1998 | Funk ..................... | G06F 12/023 711/170 |
| 7,191,319 B1 | * | 3/2007 | Dwyer .................. | G06F 9/3824 712/E9.046 |
| 8,799,554 B1 | * | 8/2014 | Vincent ................. | G06F 9/5016 718/107 |
| 9,928,178 B1 | * | 3/2018 | Solapurkar ........... | H04L 67/568 |

(Continued)

OTHER PUBLICATIONS

Sterbenz, J., Tushar Saxena, and Rajesh Krishnan. Latency-Aware Information Access with User-Directed Fetch Behaviour for Weakly-Connected Mobile Wireless Clients. BBN Tech. Report 8340, 2002. (Year: 2002).*

(Continued)

*Primary Examiner* — Nicholas J Simonetti
(74) *Attorney, Agent, or Firm* — Foley IP Law, PLLC

(57) ABSTRACT

An apparatus comprises a memory having a data cache stored therein and a control circuit operably coupled thereto. The control circuit is configured to update that data cache in accordance with a scheduled update time. In the latter regards, by one approach, the control circuit computes selected entries for the data cache prior to the scheduled update time pursuant to a prioritization scheme to provide a substitute data cache. At the scheduled update time, the control circuit switches the substitute data cache for the data (Continued)

cache such that data queries made subsequent to the scheduled update time access the substitute data cache and not the data cache.

16 Claims, 3 Drawing Sheets

(56) References Cited

U.S. PATENT DOCUMENTS

| | | | | |
|---|---|---|---|---|
| 2008/0120496 | A1* | 5/2008 | Bradford | G06F 9/384 |
| | | | | 712/E9.027 |
| 2010/0305983 | A1 | 12/2010 | De Marcken | |
| 2014/0297965 | A1 | 10/2014 | Jayaseelan | |
| 2015/0363236 | A1* | 12/2015 | Manpathak | G06F 12/0871 |
| | | | | 711/160 |
| 2016/0124852 | A1* | 5/2016 | Shachar | G06T 1/60 |
| | | | | 345/505 |
| 2017/0168956 | A1* | 6/2017 | van Greunen | G06F 12/123 |
| 2020/0409856 | A1* | 12/2020 | Navon | G06F 12/123 |
| 2021/0064592 | A1* | 3/2021 | Yao | G06F 16/2477 |
| 2023/0176980 | A1* | 6/2023 | Li | G06F 12/08 |
| | | | | 711/160 |

OTHER PUBLICATIONS

Chen, Peiqing, et al. "Out of many we are one: Measuring item batch with clock-sketch." Proceedings of the 2021 International Conference on Management of Data. Jun. 2021. (Year: 2021).*

Einziger, Gil, Roy Friedman, and Ben Manes. "Tinylfu: A highly efficient cache admission policy." ACM Transactions on Storage (ToS) 13.4 (2017): 1-31. (Year: 2017).*

Vattani, Andrea et al.; "Optimal Probabilistic Cache Stampede Prevention" Proceedings of the VLDB Endowment; Apr. 1, 2015; vol. 8 Issue 8; VLDB Endowment; 12 pages.

Chen, Tse-Hsun et al.; "CacheOptimizer: helping developers configure caching frameworks for hibernate-based database-centric web applications"; FSE 2016: Proceedings of the 2016 24th ACM SIGSOFT International Symposium on Foundations of Software Engineering; Nov. 1, 2016; Association for Computing Machinery; 12 pages.

Shtul, Ariel; "How to Get Started with Probabilistic Data Structures: Count-Min Sketch"; https://redislabs.com/blog/how-to-get-started-with-probabilistic-data-structures-count-min-sketch/; Published Nov. 22, 2019; Retrieved from Internet Archive Wayback Machine https://web.archive.org/web/20210421151747/https://redislabs.com/blog/how-to-get-started-with-probabilistic-data-structures-count-min-sketch/ on Nov. 2, 2022; 10 pages.

* cited by examiner

METHOD AND APPARATUS TO REDUCE CACHE STAMPEDING

RELATED APPLICATION

This application claims the benefit of U.S. Provisional application No. 63/229,224, filed Aug. 4, 2021, which is incorporated by reference in its entirety herein.

TECHNICAL FIELD

These teachings relate generally to cache management and in particular to managing cache stampeding.

BACKGROUND

Cache stampeding is a known technological challenge. A cache stampede is a type of cascading failure that can occur when (typically large) parallel computing systems with caching mechanisms experience heavy loading.

As one example in these regards, under very heavy load, when cached information expires, there may be sufficient concurrency in a corresponding server farm that multiple threads of execution will all attempt to render the content of that information simultaneously. Systematically, none of the concurrent servers know that the others are doing the same rendering at the same time. If sufficiently high load is present, this may by itself be enough to bring about a congestion collapse of the system due to the exhausting of shared resources. Congestion collapse in turn can prevent the information from ever being completely re-cached, as every attempt to do so times out. Thus, cache stampede reduces the cache hit rate to zero and keeps the system continuously in congestion collapse as the system attempts to regenerate the resource for as long as the load remains sufficiently heavy.

BRIEF DESCRIPTION OF THE DRAWINGS

The above needs are at least partially met through provision of the method and apparatus to reduce cache stampeding described in the following detailed description, particularly when studied in conjunction with the drawings, wherein.

DETAILED DESCRIPTION

Figure 1:
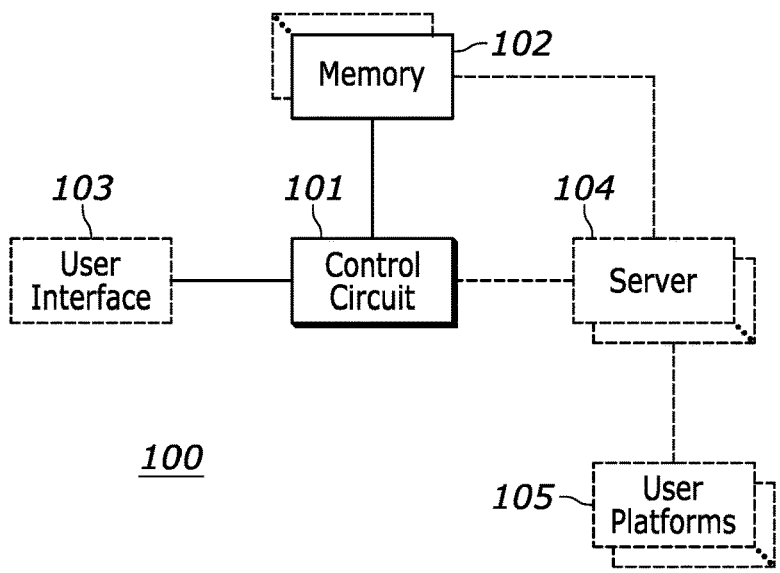
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

Generally speaking, these various embodiments serve to at least reduce cache stampeding. By one approach, an apparatus comprises a memory having a data cache stored therein and a control circuit operably coupled thereto. The control circuit is configured to update that data cache in accordance with a scheduled update time. In the latter regards, by one approach, the control circuit computes selected entries for the data cache prior to the scheduled update time pursuant to a prioritization scheme to provide a substitute data cache. At the scheduled update time, the control circuit switches the substitute data cache for the data cache such that data queries made subsequent to the scheduled update time access the substitute data cache and not the data cache.

By one approach the control circuit is configured, at least in part, as a probabilistic data structure that effects the aforementioned prioritization scheme. By one approach the aforementioned prioritization scheme comprises, at least in part, identifying which items in the data cache are being accessed more frequently than other items in the data cache such that at least some of the computed selected entries are computed based upon those entries having been accessed more frequently than other items in the data cache.

By one approach, subsequent to the scheduled update time, the control circuit computes additional selected entries for the substitute data cache. By one approach those additional selected entries have a lower prioritization per the aforementioned prioritization scheme.

By spreading out necessary computations ahead of a scheduled time-of-need, and by utilizing a prioritization scheme that tends to ensure that more frequently accessed items are updated ahead of that scheduled time-of-need, these teachings help ensure the availability of updated information in a data cache at a time-of-need (and shortly thereafter) while avoiding the cash stampede phenomena. In particular, avoiding the immediate computation of data that is not frequently requested can help prevent a drastic growth in cache size while also spreading out the eventual removal of stale data.

These and other benefits may become clearer upon making a thorough review and study of the following detailed description. Referring now to the drawings, and in particular to FIG. 1, an illustrative apparatus 100 that is compatible with many of these teachings will now be presented. For the sake of an illustrative example it will be presumed here that a control circuit of choice carries out the actions, steps, and/or functions of these teachings.

In this particular example, the enabling apparatus 100 includes such a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

By one optional approach the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101). It will also be understood that this "memory" can be comprised of a plurality of different discrete memory platforms that may, or may not, be physically or logically linked one to another.

In addition to the aforementioned data cache, which may contain entries corresponding to hundreds of thousands of discrete items, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach the control circuit 101 operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

As appropriate to the application setting, these teachings will accommodate one or more servers 104 that connect to one or both of the aforementioned control circuit 101 and memory 102. This servers(s) 104, in turn, can communicate with user platforms 105. So configured, the server 104 can query and utilize information in the data cache (as stored in the memory 102) to respond to inquiries from various users.

If desired, the control circuit 101 may also optionally operably couple to a network interface (not illustrated). Network interfaces, including both wireless and non-wireless platforms, are well understood in the art and require no particular elaboration here. Such a network interface may serve, in an appropriate application setting, to facilitate, for example, communications between the control circuit 101 and the server(s) 104.

Figure 2:
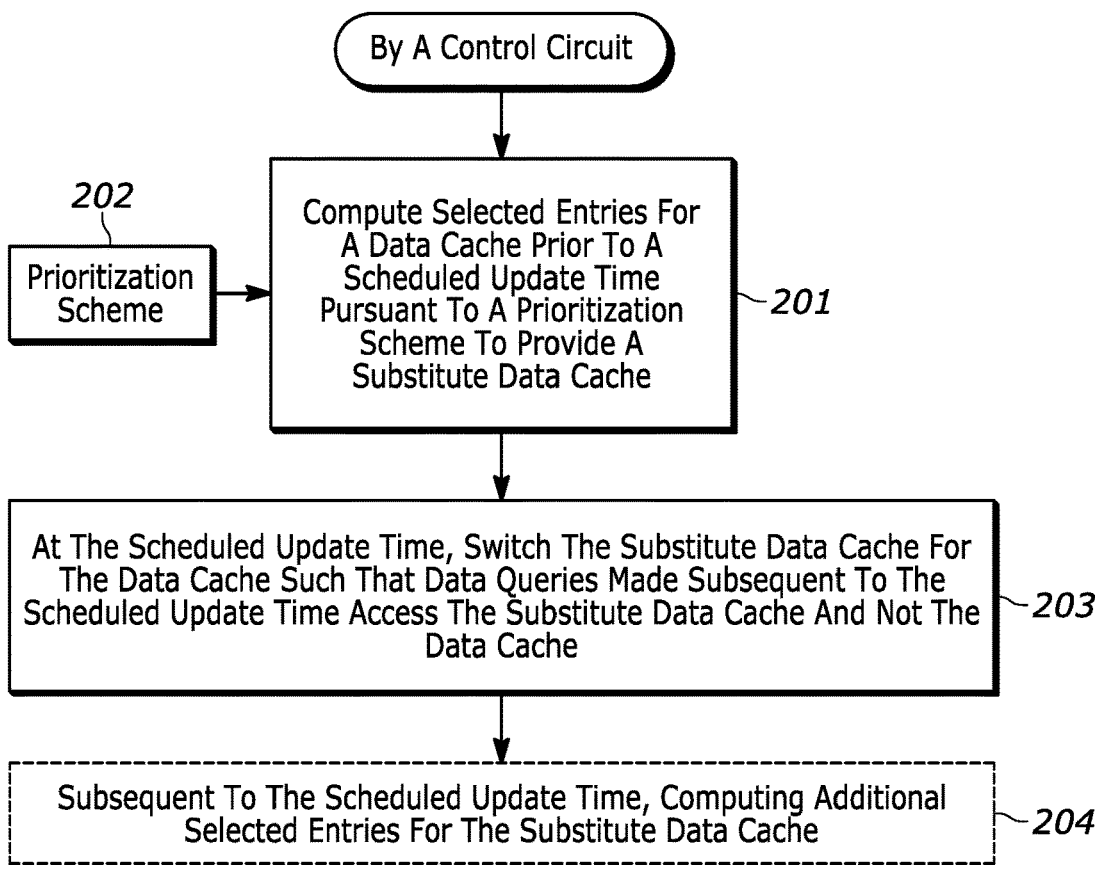
FIG. 2 comprises a flow diagram as configured in accordance with various embodiments of these teachings.

Referring now to FIG. 2, a process 200 that can be carried out by the above-described control circuit 101 will be described. Generally speaking, this process 200 helps to facilitate updating the aforementioned data cache in accordance with a scheduled update time (such as, for example 1 second past midnight on a particular day).

At block 201, the control circuit computes selected entries for the data cache prior to the scheduled update time pursuant to a prioritization scheme 202 to thereby provide a substitute data cache. The degree by which this activity begins "prior" to the scheduled update time can vary as desired with the application setting, but typically will be relatively close to that scheduled update time. For example, these teachings will accommodate beginning this activity within 10 to 15 minutes of the scheduled update time, within five minutes of the scheduled update time, or within one minute of the scheduled update time as desired. The precise timing can be varied as desired to suit the requirements and/or opportunities presented by a given application setting.

In a typical application setting, the goal is not to complete computing all of the necessary entries for the data cache prior to that scheduled update time. In fact, attempting to meet such a goal can lead to a cash stampede. At least one purpose of the prioritization scheme 202 is to facilitate computing entries for the data cache selected in a way that maximizes likely effectiveness and minimizes downstream confusion owing to stale cache data.

Generally speaking, by one approach, this prioritization scheme 202 comprises, at least in part, identifying those items in the data cache that are being accessed (for example, via the aforementioned user platforms 105) more frequently than other items in the data cache during, for example, a predetermined window of time. By one approach, and for each product, the product's corresponding popularity can be calculated based on its frequency during the last one hour. (The scheduled time can represent, for example, a major multi-product promotional event or a product-specific promotion that would trigger a need for cache refresh.) Using this approach, the control circuit 101 can compute at least some of the computed selected entries based upon those entries having been accessed more frequently than other items in the data cache.

By one approach, the control circuit 101 is configured, at least in part, as a probabilistic data structure that effects the prioritization scheme 202. This probabilistic data structure may, for example, comprise a time aggregation count-min sketch that prioritizes pre-computation of the frequently requested data over other data. Those skilled in the art will recognize the count-min sketch approach as being based upon a probabilistic data structure that serves as a frequency table of events in a stream of data. It typically uses hash functions to map events to frequencies, but unlike a hash table uses only sub-linear space, at the expense of overcounting some events due to collisions.

These teachings provide for creating a 2-dimensional sketch of w*d where w is the array of a counter and d is the set of hash functions in each array where each array is basically a sequence of rows and each request is mapped into the hash function of that row. To add/process a request, these teachings provide for mapping it to each row via its hash function and incrementing the mapped counter.

For querying a request, one can estimate the count from the sketch.

For updates, one can inspect the counter in the first row where the request was mapped by the first hash function, the counter in the second row where it was mapped by the second hash function, and so forth. In each row, these teachings provide a counter that is incremented by every occurrence of that request. Keeping in mind the collisions that might have also incremented those counters with requests mapped to same locations, one can take the minimum of the counter values.

These teachings can help determine an estimate of frequently-requested data entries/items. It is possible that, for a highly distributed system with millions of requests being processed, old values have diminishing value and simultaneously decreased accuracy. For example, in a retail catalog, an item that might be briskly selling 24 hours ago because of a sale might lose its appeal the following day and is not as relevant for cache management 24 hours later. This situation can be mitigated by introducing a time aggregate on the count-min sketch value by aggregating the sketch values for Ti time intervals of length $\{1, 1, 2, 4, 8, \ldots, 2m\}$ as follows:

```
for all m do
    Initialize Count-Min sketch Mm = 0
end for
Initialize t = 0 and M¯ = 0
while data arrives do
    Aggregate data into sketch M¯ for unit interval
    t ← t + 1 (increment counter)
    for j = 0 to argmax { 1 where i mod 2j = 0 do
        T ← M¯ (back up temporary storage)
        M¯ ← M¯ + Mj (increment cumulative sum)
        M ← T (new value for Mj)
    end for M¯ ← 0 (reset aggregator)
end while
```

Figure 3:
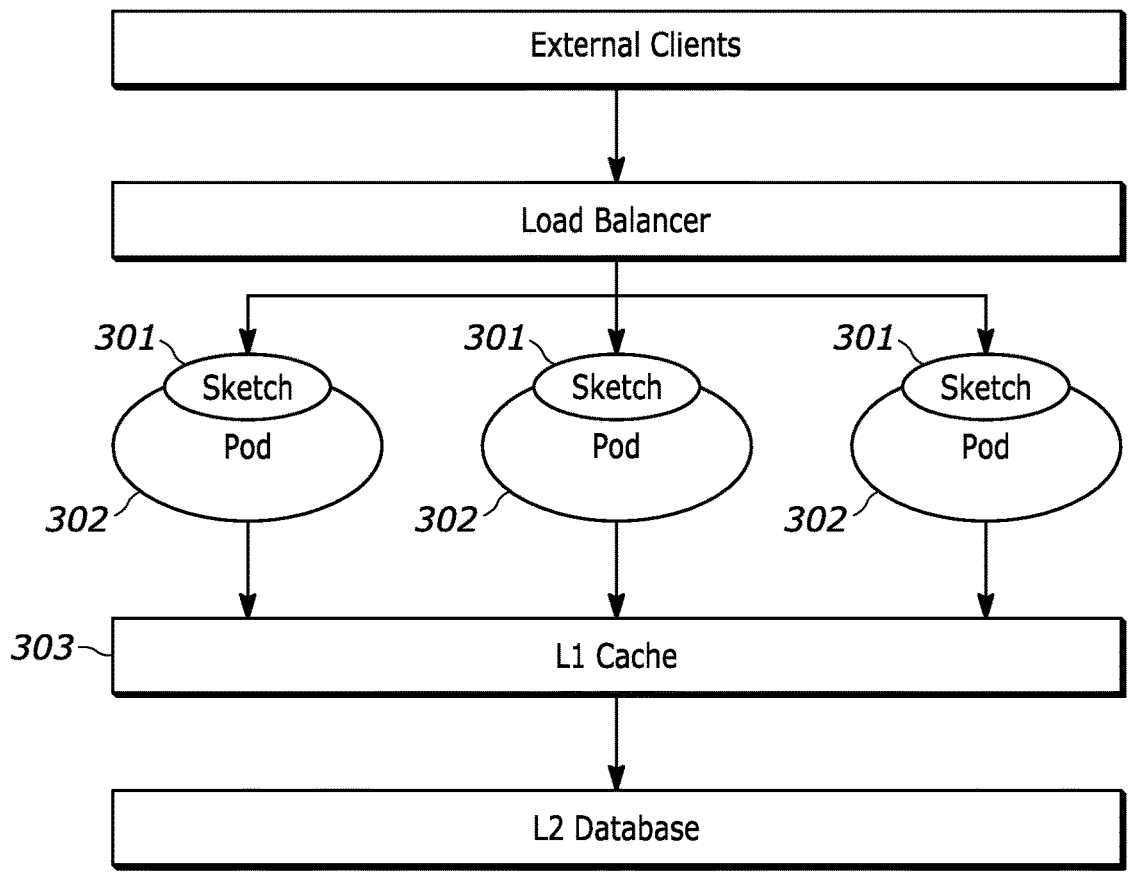
FIG. 3 comprises a schematic hierarchical view as configured in accordance with various embodiments of these teachings.
Figure 4:
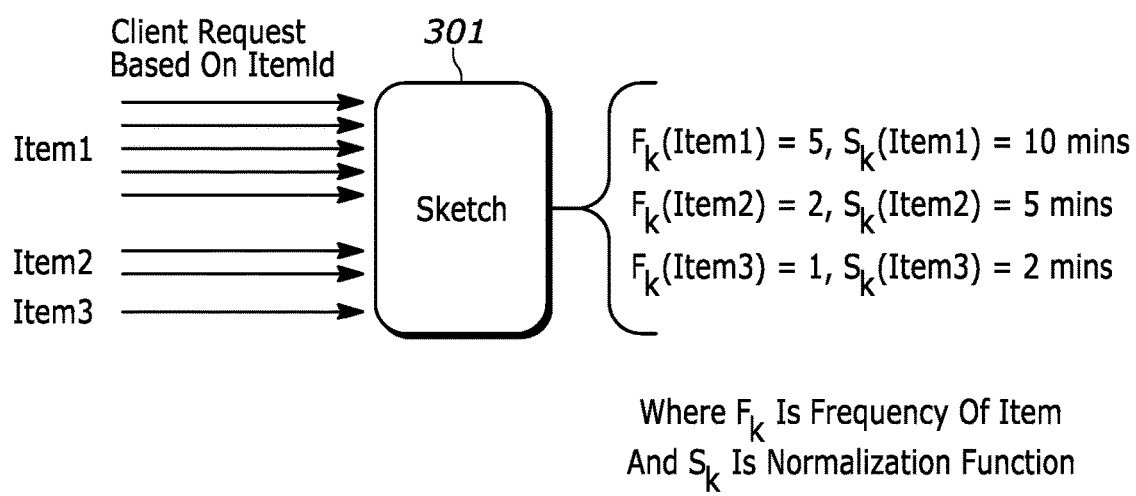
FIG. 4 comprises a flow diagram as configured in accordance with various embodiments of these teachings.

Referring momentarily to FIGS. 3 and 4, some additional details in these regards will now be provided. It will be understood that these details are intended to serve an illustrative purpose and are not intended to suggest any particular limits with respect to these teachings.

In this illustrative example these teachings provide for running one instance of count-min sketch on each application pod 302 to capture its own metrics. In this example, each application server maintains a local instance of count-min sketch data structure and independently determines the frequency $f_k$ for each incoming item k in a stream.

When the service reads from the L1 cache 303 and is responding back, the control circuit 101 may execute the following code:

```
function Fetch(k)
    value, expiry ← CacheRead(k)
    if now( ) + S(k) + Rn >= expiry && L1(k).size = 1 then
        value ← RecomputeValueAsOf(k)
        CacheWrite(k, value, ttl) //append to L1 list
    else if now( ) - S(k) - Rn' > expiry and L1(k).size > 1 then
        CacheDelete(k) //delete the expired entry from L1 list
    end
    return value
end
``` where $S_k = N(f_k)$ where N is the normalized function that calculates the score based on frequency $f_k$ $f_k$=frequency calculated by time aggregated count-min sketch $R_n$=is a randomized function that creates jitter from pre-computation $R_n'$=is a randomized Fn that creates jitter for expiry.

Instead of storing just one document in L1, the L1 cache may support multiple values for key in cache. Once the service encounters more than 1 doc in the list, it can iterate over the expiry dates to get the right one. In some application settings, however, there will be only one document that can be served as it is.

For the sake of illustration, consider now an example for an event day having an expiry at 9 pm. The following example is expressed in terms of a retail catalog being queried for productids (i.e., product identifiers) and clubids (i.e., facility identifiers).

In this example, Pod1 gets a request for a top requested product P1 for club C1 at 8:49:55 pm (i.e., shortly before the 9 pm scheduled update time. Pod1 will read from L1 and run through the aforementioned algorithm. As it is the top requested product, S(k) will be 10 mins, and Rn return 3 seconds randomly. 8:49:55+10 min+3 sec=8:59:58 which is prior to 9:00:00, so the process will just return the current L1 value.

Now presume another Pod2 receives the same request at the same time but the Rn return is 7 seconds instead of 3 seconds as in the foregoing example. This pod will calculate a new L1 future value in the background and append it to the L1 list (these teachings will support continuing use of cache lock to avoid any race conditions). After the event has started, S'(k) will return 0 for P1_C1 as it is top requested. With a Rn' value of, say, 5 minutes, the expired entry from L1 list will be removed by any subsequent request after 9:05:00.

Now consider an item that is not frequently requested. S(k) will return 0 and S'(k) returns 10 minutes. In most cases, there will not be any requests and L1 will contain either nothing or stale data until someone requests that information. For any requests between 8:50 and 8:59 this process need not spend any resources to calculate their respective future values as we know that there are low chances of such requests being requested again in the near future. Similarly, this approach presumes to wait the longest to delete it from L1 after the event start because these teachings emphasize utilizing resources for more frequently requested items.

Figure 5:
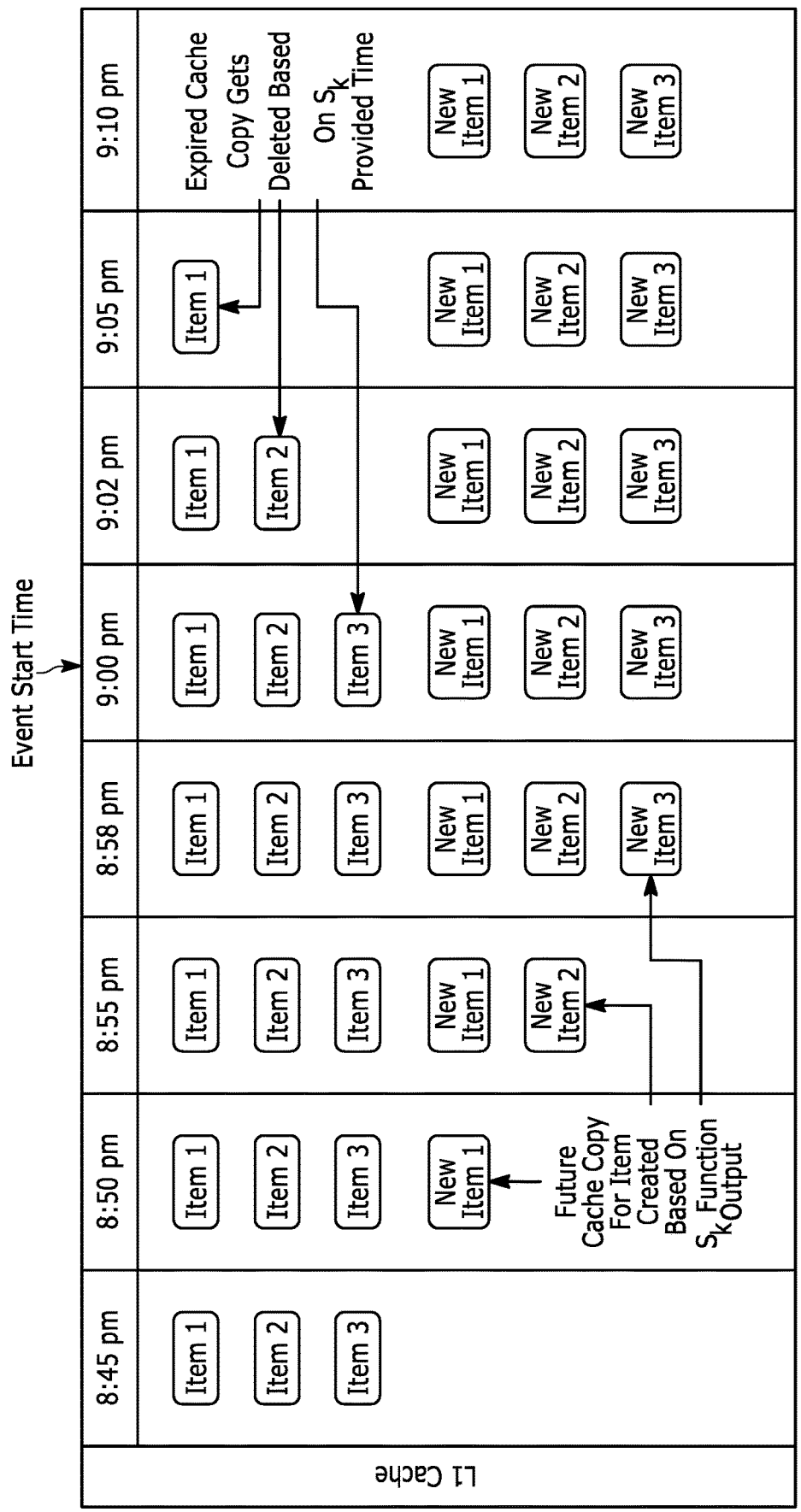
FIG. 5 comprises a timing diagram as configured in accordance with various embodiments of these teachings.

FIG. 5 provides an illustrative (albeit simplified) timing diagram of when three different items (item 1, item 2, and item 3) have their value information calculated/generated and deleted per these teachings.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. An apparatus configured to at least reduce cache stampeding, the apparatus comprising:
   a memory having a data cache stored therein; and
   a control circuit operably coupled to the memory and configured as a probabilistic data structure to update the data cache in accordance with a scheduled update time, by:
   prior to the scheduled update time, computing selected entries of the data cache pursuant to a prioritization scheme that uses hash functions to map events to frequencies using sub-linear space, the prioritization scheme creating a score for entries of the data cache that comprises a normalized function of a use frequency of the entry added with a random value generated using a jitter function;

generating a substitute data cache using the computed selected entries; and at the scheduled update time, switching the substitute data cache for the data cache such that data queries made subsequent to the scheduled update time access the substitute data cache and not the data cache.

2. The apparatus of claim 1 wherein the data cache contains entries corresponding to hundreds of thousands of discrete items.

3. The apparatus of claim 1 wherein the prioritization scheme comprises, at least in part, identifying which items in the data cache are being accessed more frequently than other items in the data cache.

4. The apparatus of claim 1 wherein the prioritization scheme comprises, at least in part, identifying which items in the data cache are being accessed more frequently than other items in the data cache during a predetermined window of time.

5. The apparatus of claim 1 wherein the prioritization scheme comprises, at least in part, identifying which items in the data cache are being accessed more frequently than other items in the data cache such that at least some of the computed selected entries are computed based upon those entries having been accessed more frequently than other items in the data cache.

6. The apparatus of claim 1 further comprises, subsequent to the scheduled update time, computing additional selected entries for the substitute data cache.

7. The apparatus of claim 6 wherein the additional selected entries have a lower prioritization per the prioritization scheme.

8. The apparatus of claim 1 wherein computing the selected entries pursuant to the prioritization scheme further determines an estimate of frequently-requested data items.

9. A method to at least reduce cache stampeding, the method comprising:

computing, by a control circuit operably coupled to a memory having a data cache stored therein, selected entries for the data cache prior to a scheduled update time pursuant to a prioritization scheme, the prioritization scheme creating a score for entries of the data cache that comprises a normalized function of a use frequency of the entry added with a random value generated using a jitter function;

generating a substitute data cache using the computed selected entries; and at the scheduled update time, switching the substitute data cache for the data cache such that data queries made subsequent to the scheduled update time access the substitute data cache and not the data cache.

10. The method of claim 9 wherein computing the selected entries pursuant to the prioritization scheme further comprises:

generating a two-dimensional sketch of an array of a counter and a set of hash functions, wherein the array is a sequence of rows;

mapping each request for data into a hash function of a row in the sequence of rows;

incrementing the counter at each occurrence of the request; and aggregating counter values for predetermined time intervals to introduce a time aggregate.

11. The method of claim 9 wherein the prioritization scheme comprises, at least in part, identifying which items in the data cache are being accessed more frequently than other items in the data cache.

12. The method of claim 9 wherein the prioritization scheme comprises, at least in part, identifying which items in the data cache are being accessed more frequently than other items in the data cache during a predetermined window of time.

13. The method of claim 9 wherein the prioritization scheme comprises, at least in part, identifying which items in the data cache are being accessed more frequently than other items in the data cache such that at least some of the computed selected entries are computed based upon those entries having been accessed more frequently than other items in the data cache.

14. The method of claim 9 further comprises, subsequent to the scheduled update time, computing additional selected entries for the substitute data cache.

15. The method of claim 14 wherein the additional selected entries have a lower prioritization per the prioritization scheme.

16. The method of claim 9 wherein the control circuit is configured, at least in part, as a probabilistic data structure that effects the prioritization scheme.

* * * * *